US006785244B2

(12) United States Patent
Roy

(10) Patent No.: US 6,785,244 B2
(45) Date of Patent: Aug. 31, 2004

(54) APPARATUS AND METHOD FOR PROVIDING MULTIMEDIA CONFERENCING SERVICES WITH SELECTIVE INFORMATION SERVICES

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/346,510

(22) Filed: Jan. 17, 2003

(65) Prior Publication Data

US 2003/0108001 A1 Jun. 12, 2003

Related U.S. Application Data

(63) Continuation of application No. 09/370,827, filed on Aug. 9, 1999, now Pat. No. 6,600,725.
(60) Provisional application No. 60/112,740, filed on Dec. 16, 1998.

(51) Int. Cl.[7] .......................... G01R 31/08; H04L 12/16
(52) U.S. Cl. ....................... 370/252; 370/260; 370/265; 379/202.01; 709/204
(58) Field of Search ............................... 370/259–271; 709/200, 204–207; 379/201.01, 201.12–206.01

(56) References Cited

U.S. PATENT DOCUMENTS

| 5,991,276 | A | * | 11/1999 | Yamamoto | .................. | 370/260 |
| 6,122,259 | A | * | 9/2000 | Ishida | ........................ | 370/260 |
| 6,332,153 | B1 | * | 12/2001 | Cohen | ......................... | 709/204 |
| 6,392,760 | B1 | * | 5/2002 | Ahuja et al. | ................ | 358/400 |
| 6,411,988 | B1 | * | 6/2002 | Tafoya et al. | ............... | 709/204 |
| 6,437,818 | B1 | * | 8/2002 | Ludwig et al. | .......... | 348/14.09 |

FOREIGN PATENT DOCUMENTS

GB    2313251 A  * 11/1997  ............ H04M/3/56

OTHER PUBLICATIONS

Nakajima et al., ConverStation/2: An Extensible and Customizable Realtime Multimedia Conferencing System, IBM Research Laboratory, see entire document.*

* cited by examiner

Primary Examiner—Duc Ho

(57) ABSTRACT

The invention provides an apparatus and method that allows the operator of each user device participating in a multimedia conference to selectively receive information services during the multimedia conference. The apparatus includes a controller for receiving start-up signals from a user device, sending start-up requests to destination user devices, and receiving start-up signals from the destination user devices. The start-up signals may include information as to whether each user device requests information services to be provided during the multimedia conference. The controller establishes the multimedia conference and selectively provides the information services to the respective user devices. The information services are provided continuously or non-continuously at the preference of the user devices. The information services may also be provided in various formats at the preference of the user devices.

15 Claims, 5 Drawing Sheets

|  | 300 | 301 | 302 |
|---|---|---|---|
| | AT&T | 50% | |
| | LUCENT TECHNOLOGIES | 100% | |
| | FORD MOTOR COMPANY | 100% | |
| | SNAPPLE | 25% | |
| | ⋮ | ⋮ | |
| | STOCKS | | $4.99/HR |
| | WEATHER | | FREE |
| | SPORTS | | $1.99/HR |
| | TRAFFIC | | FREE |
| | ⋮ | | ⋮ |

*FIG. 3*

APPARATUS AND METHOD FOR PROVIDING MULTIMEDIA CONFERENCING SERVICES WITH SELECTIVE INFORMATION SERVICES

This non-provisional application claims the benefit of U.S. provisional application No. 60/112,740 entitled "Multimedia Conferencing Services and Collaboration Services Integrated with Information Services" filed on Dec. 16, 1998 and is a continuation application of application Ser. No. 09/370,827 filed Aug. 9, 1999 U.S. Pat. No. 6,600,725. The Applicant of the provisional application, parent and this continuation application is Radhika R. Roy.

BACKGROUND OF THE INVENTION

1. Field of Invention

The present invention is directed to an apparatus and method for providing multimedia conferencing services with selective information services.

2. Description of Related Art

Multimedia conferencing over communication networks to a plurality of parties is generally known in the art. Multimedia conferencing in packet-switched networks such as asynchronous transfer mode (ATM), frame relay and the like is well known, as is multimedia conferencing in circuit-switched networks such as ISDN, PSTN and the like. However, in a typical multi-party multimedia conferencing service, the same multimedia signal, including the video, audio and data portions, is provided to all parties of the multimedia conference. There is no ability to selectively provide multiple parties to a multimedia conference with information services during the multimedia conference. Thus, new technology is needed to provide a means by which each party to a multi-party multimedia conference may selectively receive information services during the multimedia conference.

SUMMARY OF THE INVENTION

The invention provides an apparatus and method that provides multimedia conferencing service to multiple parties where each party can request information services during the conference. Different information services may be provided to each party based on the preferences of the respective party. Using the invention, when an operator of a source user device enters the destination address for another user device with which communication is sought, a multimedia bridge receives the signals from the source user device. The signals include information of the identity of the source user device and the destination user devices.

Based on the information received, the multimedia bridge sends start-up requests to the selected destination user devices to be involved in the multimedia conference. Once the start-up requests are accepted, the multimedia bridge enables the multimedia conferencing service to provide communication between the user devices.

Once the multimedia bridge enables the multimedia conference, the multimedia bridge determines which user devices request information services. The multimedia bridge then provides continuous or non-continuous information services to the user devices requesting information services.

These and other features and advantages will be described in or are apparent from the following detailed description of the preferred embodiments.

BRIEF DESCRIPTION OF THE DRAWINGS

The preferred embodiments of the invention will be described with reference to the following figures, wherein like numerals designate like elements, and wherein:

FIG. 3 is a exemplary data structure of the database of FIG. 1;

DETAILED DESCRIPTION OF PREFERRED EMBODIMENTS

Figure 1:
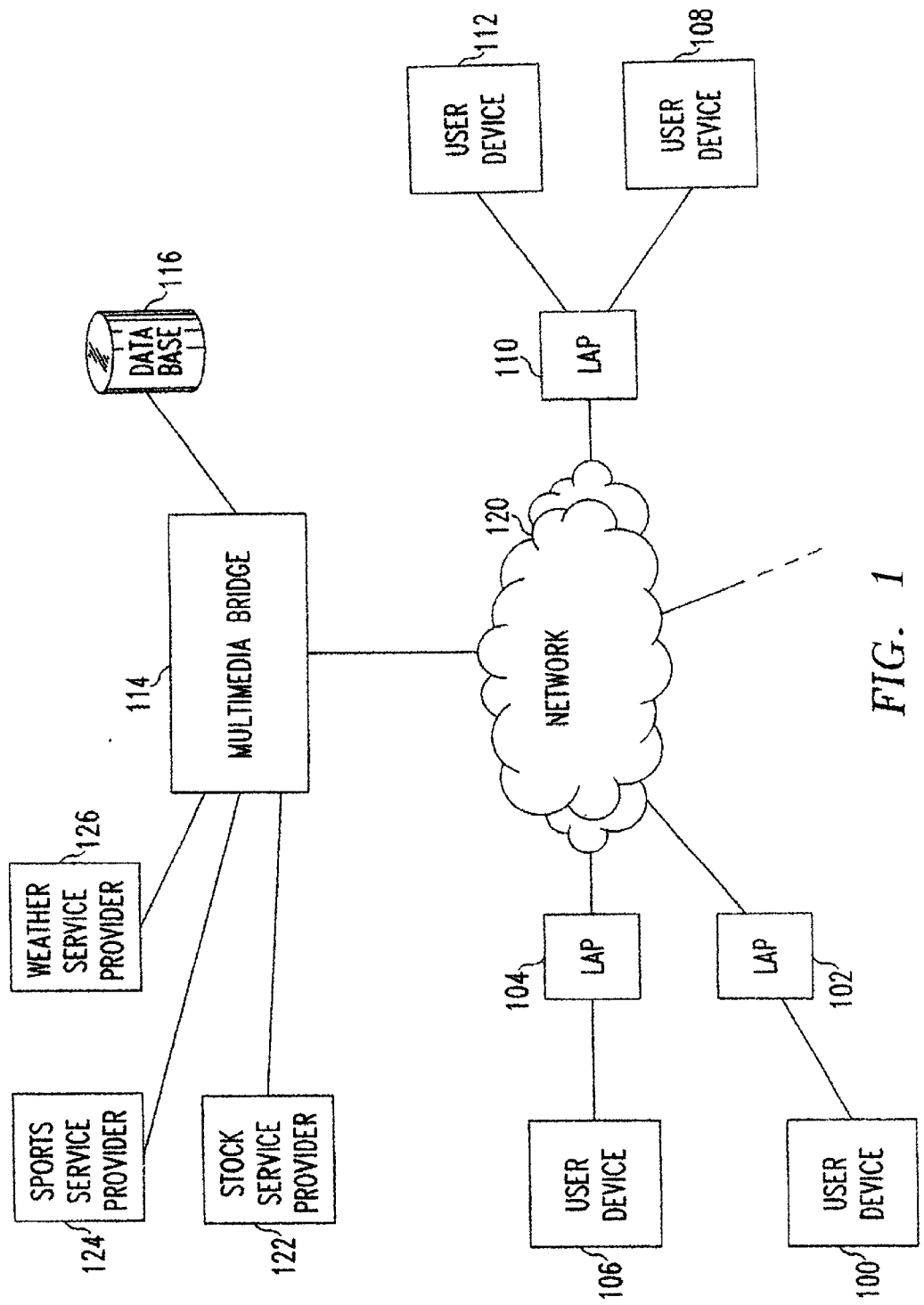
FIG. 1 is an exemplary block diagram of a multimedia conferencing system in which the invention operates.

FIG. 1 is an exemplary block diagram of a system in which the invention operates. The system includes a plurality of user devices 100, 106, 108 and 112 in communication with at least one network 120 through Local Access Providers (LAPs) 102, 104 and 110. The user devices 100, 106, 108, and 112 communicate with one another through the network 120. The network 120 is further in communication with a multimedia bridge 114.

The multimedia bridge 114 is in communication with a database 116 and/or any number of information services providers 122, 124 and 126. The database 116 is any type of database capable of providing information services to the multimedia bridge 114. For example, the database 116 may be a device for storing information to be repeatedly accessed by multiple user devices, such as business advertisements and the like. The information services providers 122, 124 and 126 may provide real-time information at the request of the user devices 100, 106, 108, and 112, such as stock updates, sports scores, traffic reports, weather reports, and the like. The information services providers 122, 124 and 126 may be directly accessible to the multimedia bridge 114 as shown in FIG. 1, or accessible by the multimedia bridge 114 through the network 120.

The multimedia bridge 114 modifies the multimedia signals to be sent to the user devices 100, 106, 108 and 112 to include information services received from the database 116 and/or the information services providers 122, 124 and 126, as requested by the respective user devices 100, 106, 108 and 112. The multimedia bridge 114 sends the modified multimedia signal, including the information services, to the user devices 100, 106, 108, 112 via the network 120.

In multimedia conferencing, many parties or users participate in the multimedia conference call using their respective user devices 100, 106, 108 and 112. A multimedia conference call may last from a few minutes to many hours. During the multimedia conference, one of the users may be speaking while the other users may be listening. The users who are in a listening mode might choose to see some other information while listening to the speaker.

According to this invention, each user may select any information service that the user prefers for viewing while she/he is in a listening mode during the multimedia conference. The information service selected may be, for example, stock service provided by stock service provider 112, sports service provided by sports service provider 124, weather service provided by weather service provider 126, or other like services. Audio, video, and/or data is bridged by the multimedia bridge 114. All audio signals go to the multimedia bridge 114 for bridging, and the multimedia bridge 114 may detect which user is speaking through activity detection of the audio signal. Thus, the multimedia bridge 114 may determine which of the user devices 100, 106, 108, and 112 participating in the multimedia conference are in a listening mode and which user devices 100, 106, 108, and 112 are in a speaking mode.

In addition, each user device 100, 106, 108, and 112 provides the multimedia bridge 114 with their respective user's preferences for information service for use while the user is in a listening mode. This information about the information services selected by the users may be stored, for example, in a service profile of the database 116 or in a memory of the multimedia bridge 114.

Once the user devices 100, 106, 108, and 112 provide the users' selections for information services, the multimedia bridge 114 will instruct the corresponding information service entity (e.g., sports service provider 124, stock service provider 122, or weather service provider 126) to provide the desired service to each user in accordance with their selected preferences. Each information service provider 122, 124 and 126 is provided with necessary information to send data to the respective user devices 100, 106, 108, and 112 by the multimedia bridge 114.

These information services can be as simple as one or more displays that are produced in the user devices 100, 106, 108, and 112 based on information sent by the service provider. Thus, the displays may also be provided to the user devices 100, 106, 108, and 112 even when the user of the user device 100, 106, 108, and 112 is a speaker. For example, the time for switching between the listening mode to the speaking mode of a user in the multimedia conferencing can always be unpredictable and may vary from milliseconds to few minutes or even more. The delay for sending the information from the information service providers 122, 124 and 126 may be larger than the time for switching between modes. If a user becomes active after a few 10 s of milliseconds, the user may still receive the information from the information service provider for a few milliseconds even if the user changes between the listening mode to the speaking mode.

A user can send an indication to the controller 201 (shown in FIG. 2) to discontinue the service at any time. The multimedia bridge provides specific instructions to the information service providers 122, 124 and 126 to disable the service to the user device 100, 106, 108, and 112. The information sent by the information server 100, 106, 108, and 112 may consist of audio information, video information, and/or data. If a user becomes a speaker after remaining silent while receiving the information from information servers 122, 124 and/or 126, and if the information from the information servers 122, 124 and/or 126 is still being sent while the user is speaking, the user may disable the data channel of the information server.

If, for example, the operator of user device 100 wishes to communicate with destination user devices 106, 108, 112 in a multimedia conference, the operator need only activate user device 100 and send start-up signals to the multimedia bridge 114. The start-up signals may include identification information regarding the destination addresses, for example the telephone number, Universal Resource Locator (URL), TCP/IP address, and the like, of the user devices 106, 108, 112.

The multimedia bridge 114 then sends a start-up request to the destination user devices 106, 108, 112. The destination user devices 106, 108, 112 respond by sending a start-up signal to the multimedia bridge 114. The multimedia bridge 114 then establishes a communication connection between the user devices 100, 106, 108 and 112.

The user devices 100, 106, 108 and 112 may be any devices that allow for the transmission of signals over communications links. For example, the user devices 100, 106, 108 and 112 may be any devices capable of sending and receiving multimedia conferencing signals such as computers, video telephones, video conference apparatus, and the like.

The user devices 100, 106, 108 and 112 are in communication with the network 120 through LAPs 102, 104 and 110 over communications links. These communications links may be any type of connection that allows the transmission of information. Some examples include conventional telephone lines, fiber optic lines, direct serial connection, cellular telephone connections, satellite communication links and the like.

The user devices 100, 106, 108 and 112 send communication signals to the multimedia bridge 114 over the communications links through LAPs 102, 104 and 110. The LAPs 102, 104 and 110 are devices that provide an interface to the network 120. The LAPs 102, 104 and 110 may include Local Exchange Carriers (LECs), Internet Access Providers (IAPs), satellite base stations, and the like.

The communication signals are received by the multimedia bridge 114 and are routed in the network 120 to the destination user device. The routing may be performed by link (e.g. ATM) or network (e.g., IP) entities, for example, which are generally known in the art.

The network 120 may be a single network or a plurality of networks of the same or different types. For example, the network 120 may include a local telephone network in connection with a long distance network. Further, the network 120 may be a data network or a telecommunications network in connection with a data network.

The network 120 is further in communication with at least one multimedia bridge 114. The multimedia bridge 114 controls the communication between a source user device (i.e., the user device initiating the communication) and destination user devices as described below.

The operator of a user device, for example user device 100, sends start-up signals to the multimedia bridge 114, including the identity of the user device 100 and of the user devices with which communication is sought, for example, user devices 106, 108, 112. The multimedia bridge 114 receives the signals from the user device 100 and sends start-up requests to the necessary user devices 106, 108, 112 involved in the multimedia conference. If the user devices 106, 108, 112 accept the start-up request, the user devices 106, 108, 112 send start-up signals back to the multimedia bridge 114.

The multimedia bridge 114 then establishes the multimedia conference between the user devices 100, 106, 108, 112. A multimedia conferencing can be established in many ways. Some examples can be seen in U.S. patent application Ser. Nos. 10/153,689, 10/154,975 and 10/132,573 which are hereby incorporated by reference in their entirety. For purposes of the following description, it is assumed that all multimedia conference calls, whether point-to-point or point-to-multipoint, are routed through the multimedia bridge 114.

For example, if a user of the user device 100 decides to set up a conference call with user devices 106, 108, and 112, the user device 100 sends start-up signals, i.e., a multimedia conference request, to multimedia bridge 114 with the required multimedia conference information. The multimedia conference information may include the addresses of user devices 100, 106, 108, and 112 and corresponding network layer performance related parameters for the user devices 100, 106, 108, and 112. The multimedia bridge 114 then retrieves the profile information from the database 116 for each user device 100, 106, 108, and 112.

The multimedia bridge 114 then examines whether the request is valid and/or has proper authorization. If the multimedia request of the user device 100 is not valid and/or not authorized, the multimedia bridge 114 sends a rejection message to the user device 100. If the request is valid, the multimedia bridge 114 will send an invitation, i.e., start-up signals, to the user devices 106, 108, and 112.

The user devices 106, 108, and 112 examine all criteria for joining the multimedia conference call including the performance parameters. Each user device 106, 108, and 112 then communicates, i.e., sends start-up reply signals, to the multimedia bridge 114 and identifies the desired criteria, including the performance parameters, for their joining the multimedia conference.

The multimedia bridge 114 examines the start-up reply of each user device 106, 108, and 112, and sets the desired performance criteria and information services of each party to be in accordance with the information provided in the start-up replies from the user devices 106, 108, and 112. The multimedia bridge 114 then prepares itself to bridge this multimedia conference call in accordance with the performance criteria agreed upon by each user device 100, 106, 108, and 112. It should be noted that all of the user devices 100, 106, 108, and 112 may not have the same performance parameters and information services. For example, user 100 may subscribe to sports services provided by sports service provider 124, user device 106 may subscribe to stock services provided by stock service provider 122, and user device 112 may subscribe to weather services provided by weather service provider 126.

If needed, the multimedia bridge 114 may also store detailed information of the multimedia conference call in database 116 or in an associated memory for later use, such as for billing purposes. The multimedia bridge 114 may then send a reply back to each of the user devices 100, 106, 108, and 112 confirming that the multimedia conference call has been accepted. After obtaining the confirmation of the acceptance of the multimedia conference call, the user devices 100, 106, 108, and 112 may start to communicate with one another using audio, video, and/or data as desired. The multimedia conference continues until an end condition occurs.

It may happen that some of the user devices 106, 108, and 112 may not be willing to join the multimedia conference call. The respective user devices 106, 108, and 112 that declined to join the multimedia conference will not be connected by the multimedia bridge 114, and information to this effect may be transmitted to the user device 100.

Using the above architecture, the multimedia bridge 114 can selectively provide information services to user devices 100, 106, 108 and 112. Each user device 100, 106, 108 and 112 can independently choose to receive information services during a multimedia conference. The information services may be provided in a continuous manner or a non-continuous manner, for example, an update provided every five minutes.

Although the above description is directed to providing information services when a user device is in a listening mode, the information services may also be provided at all times during the multimedia conference. In this case, detection of which user device is the speaker is not necessary.

Further, the information services may be provided to the user devices 100, 106, 108 and 112 in any multimedia form, such as text, audio, video, graphics, or any combination of these. For example, the information services may be superimposed over a portion of a video display of the user device 100, 106, 108 or 112 (e.g., scrolling text across the top or bottom of the display). Alternatively, the information services may be provided in a banner separate from the multimedia conference video (e.g., a banner positioned at the top or bottom of the display). As another alternative, the multimedia video and the information services may be provided in a split screen format or a picture-in-picture format, with the information services provided as text, video, graphics, audio, or a combination of any of the these forms. The format in which the information services are provided may be determined by the service provider, the business providing the advertisements, hardware and software limitations, and/or user preferences.

As discussed above, the information services may be information stored in the database 116, such as a business advertisement, or real-time information provided by the service providers 122, 124, 126, such as stock updates, sports scores, traffic updates, weather updates, and the like. In the case of advertising information, the advertiser may agree to pay for all or a portion of the multimedia conference fees for each user device that requests that advertiser's information. On the other hand, in the case of real-time information, the user device may owe additional service fees to the entity providing the real-time information service. The entity may be the same entity that is providing the multimedia conference, or it may be an independent entity.

Figure 2:
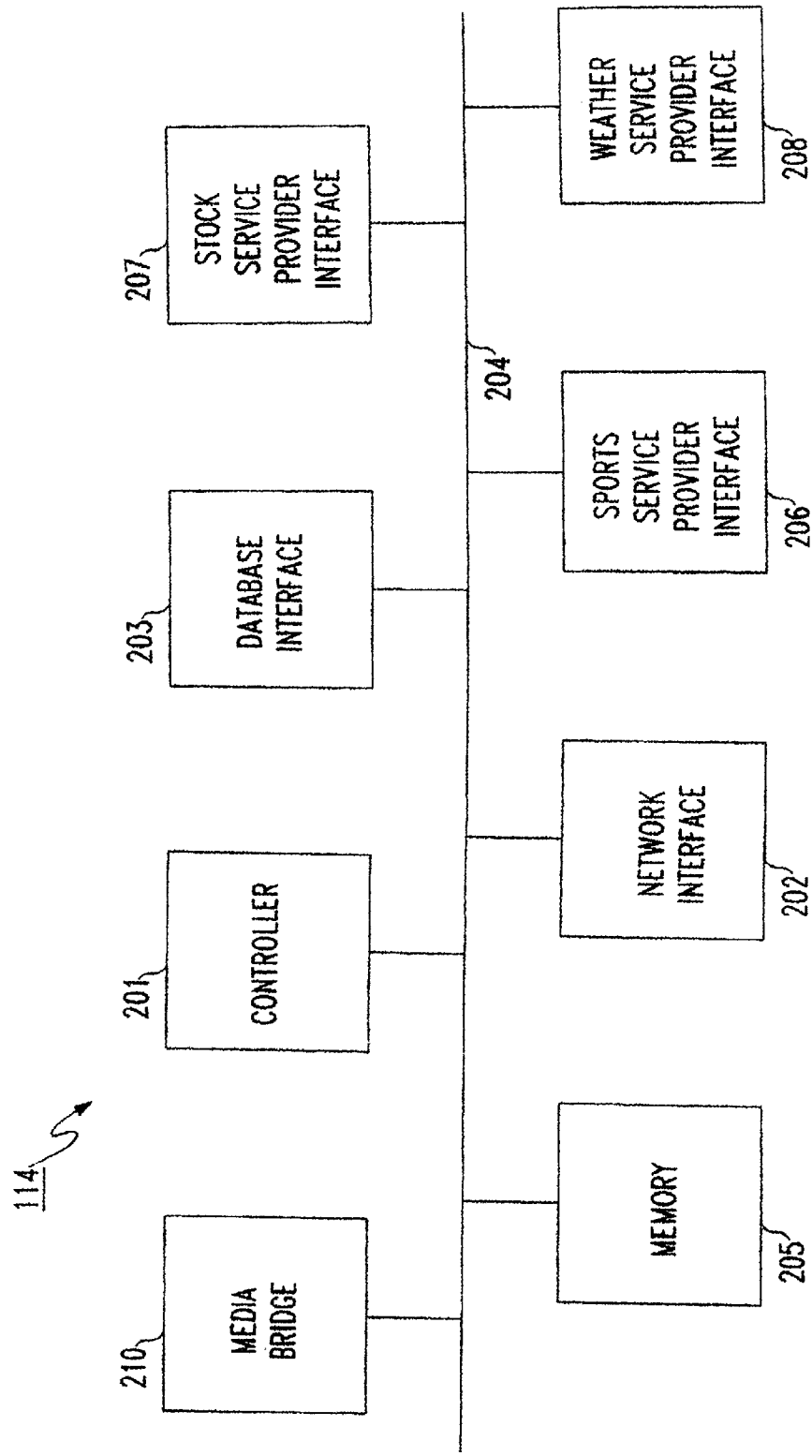
FIG. 2 is a block diagram of the multimedia bridge of FIG. 1.

FIG. 2 is a block diagram of the multimedia bridge 114 of FIG. 1. The multimedia bridge includes a controller 201, a network interface 202, a database interface 203, media bridge 210, a bus 204, a memory 205, and service provider interfaces 206, 207 and 208. The controller 201 controls the operation of the multimedia bridge 114 and directs communication between itself, the memory 205, the media bridge 210 and the interfaces 202, 203, 206, 207 and 208. The memory 205 stores information regarding each user device's preferences for receiving information services during the multimedia conference. The media bridge 210 bridges the various media types (audio, video and data) among the user devices 100, 106, 108 and 112. The controller 201, the memory 205, the media bridge 210 and interfaces 202, 203, 206, 207 and 208 communicate with one another over the bus 204.

The network interface 202 provides a communication pathway between the controller 201 and the network 120. The database interface 203 provides a communication pathway between the controller 201 and the database 116. The service provider interfaces 206, 207, 208 provide communication pathways between the controller 201 and the real-time information services providers 122, 124, 126.

The operation of the multimedia bridge 114 will now be explained with reference to an exemplary operation of the invention. In this example, it is assumed that three user devices 100, 106 and 112 are involved in the multi-party multimedia conference. However, the example operation is also applicable when there are any number of user devices involved in a multimedia conference.

When an operator of the user device 100 wishes to communicate with the operator of the user devices 106, 112, for example, the operator of the user device 100 transmits a start-up message to the multimedia bridge 114 containing identification information identifying the source user device 100 and the destination user devices 106, 112. The controller 201 of the multimedia bridge 114 receives the start-up signal through the network interface 202.

The controller 201 then sends a start-up request to the user devices 106 and 112. The start-up request may be any graphic, video or audio prompt, for example, a pop-up menu, a pull-down menu, an audio request, and the like.

Once the user devices 106 and 112 accept the request, the controller 201 can commence the multimedia conference. The controller 201 can then prompt the user devices to choose whether to receive information services. Alternatively, the user devices 106 and 112 may include requests for information services when requesting or accepting the start-up signals.

The controller 201 then determines which user devices request to receive information services, whether the information services are to be provided continuously or non-continuously, and what information services each user device wants to receive. The controller 201 stores these user requests in the memory 205. Thus, the controller 201 can provide information services to the requesting user devices throughout the multimedia conference.

Once the multimedia conference is commenced, the controller 201 monitors the multimedia conference to determine when to provide information services to those user devices that only requested information services when they are not speaking. The controller 201 may detect which user device is speaking by comparing the decibel levels of the incoming audio streams from each user device 100, 106 and 112, or in any other manner generally known in the art.

The media bridge 210 can detect the speech, voice or audio activity whether a user is speaker or not. For example, if a user speaks, his/her audio signal energy will increase and the audio energy will decrease or remain at zero if the user does not speak. In this way, the media bridge 210 is able to detect whether a user is speaking or not. The media bridge 210 communicates this information to the controller 201 which may take necessary actions with respect to providing the appropriate information services.

In addition, the controller 201 monitors the multimedia conference to determine whether any user device wishes to change its preferences, such as switching from non-continuous information services to continuous, no information services to continuous, etc. A change in user preferences can be effectuated through the use of pull-down menus, pop-up menus, commands entered through a user interface, audio commands, and the like.

FIG. 3 is an example of a data structure of the database 116 according to the first embodiment. As shown in FIG. 3, the data structure contains a listing of advertisers and information services 300, what portion or amount an advertiser pays for the user device's multimedia conference costs 301, and what fee is associated with each information service 302. Thus, the multimedia bridge 114 may access the database 116 and provide the user devices 100, 106, 108, 112 with a menu of options for listening to advertisements or viewing information services. The menu may also specify what amount the advertisers will pay for the user device's multimedia conference costs and what cost is associated with each information service. For example, when a user device requests stock prices, the user device will be charged at the rate of $4.99/hour. On the other hand, when a user device elects to receive advertising information from AT&T, AT&T pays for 50% of the cost of the user device's multimedia conference call.

As a practical example of the operation of the multimedia bridge 114, consider Alan, Bob and Cindy, wishing to communicate with each other in a multimedia conference. Alan initiates the communication by turning on the user device 100 and sending a start-up request to the multimedia bridge 114 requesting a multimedia conference with Bob and Cindy, and identifying Bob's and Cindy's user devices 106, 112. The multimedia bridge 114 receives the signals from Alan's user device and sends start-up requests to Bob's and Cindy's user devices.

The multimedia bridge 114 then sends a start-up request to Bob's and Cindy's user devices 106, 112. Bob's and Cindy's user devices 106, 112 send signals to the multimedia bridge 114 accepting the start-up request. Bob's acceptance signal also includes information requesting continuous weather information services. The multimedia bridge 114 completes the communication connection and initiates the multimedia conference. The multimedia bridge 114 also prompts Alan's and Cindy's user devices for information services. Alan chooses to receive advertising information from Lucent Technologies while he is not speaking. Cindy chooses not to receive information services during the multimedia conference.

The multimedia bridge 114 continues the multimedia conferences while providing Bob with continuous weather information and providing Alan with Lucent Technologies advertisements when he is not speaking. For example, the weather information is provided to Bob in a split screen format such that Bob may continuously view The Weather Channel and control the volume of the audio. Alan receives the Lucent Technologies advertisements in a picture-in-picture format so that when Alan is not speaking he receives video and audio of the advertisements, but when he is the speaker, the advertisements are paused and the volume is muted.

During the multimedia conference, Cindy decides that she would like to receive stock updates while she is not speaking. Thus, Cindy's user device sends a signal to the multimedia bridge 114 requesting the information services. The change in user preferences can be effectuated though the use of pull-down menus, pop-up menus, commands entered through a user interface, audio commands, and the like.

While monitoring for changes in user preferences, the multimedia bridge 114 detects Cindy's request and begins providing her with real-time stock updates when she is not speaking. For example, the real-time stock updates are provided to Cindy in a banner format, rather than being superimposed over the multimedia video signals.

The multimedia bridge 114 also monitors for changes in the speaking user device so that non-continuous information services can be provided to those parties who do not want information services on their monitor while they are speaking. The controller 201 may detect which user device is speaking by comparing the decibel levels of the incoming audio streams from each user device 100, 106, 108, 112, or in any other manner generally known in the art, as discussed above.

Figure 4:
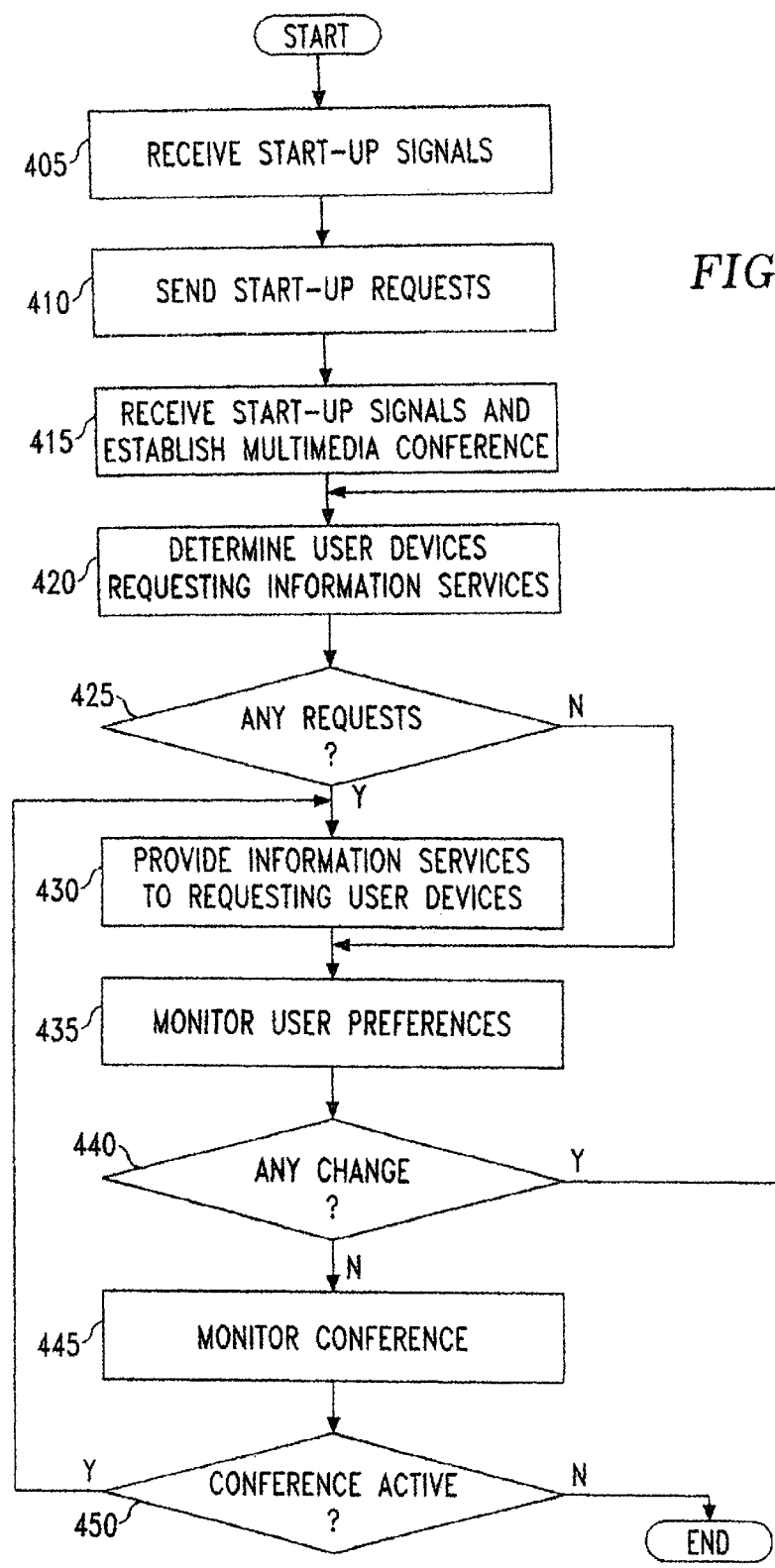
FIG. 4 is a flowchart of the operation of the invention according to an exemplary embodiment.

FIG. 4 is a flowchart of an exemplary operation of the multimedia bridge 114 according to a first exemplary embodiment. In step 405, the controller 201 receives a start-up signal through the network interface 202 from a source user device 100, for example, and goes to step 410. The start-up signal includes identifying information that identifies the source and destination user devices 100, 106 and 112, for example. In step 410, the controller 201 sends start-up requests to the other user devices that are to be involved in the multimedia conference—for example, destination user devices 106 and 112—and continues to step 415.

In step 415, the controller 201 receives start-up signals from the destination user devices 106, 112 and establishes a multimedia conference among the source and destination user devices 100, 106, and 112, for example, and continues to step 420. In step 420, the controller 201 determines which user devices, if any, request information services to be provided during the multimedia conference and goes to step 425. As described above, this can be accomplished with any graphical, video or audio input, such as pull-down menus, pop-up menus, commands entered through a user interface, audio commands and the like.

In step 425, if any user devices request information services, the controller 201 continues to step 430; otherwise, the controller 201 jumps to step 435. In step 430, the controller 201 selectively provides information services to the user devices that requested information services. An exemplary operation of the controller 201 in selectively providing information services is described in more detail below with respect to FIG. 5. The controller 201 then continues to step 435.

In step 435, the controller 201 monitors for a change in user preferences (i.e., whether a party wants to begin or cease receiving information services) and continues to step 440. In step 440, if the controller 201 detects a change in the preferences of one or more user devices, the controller 201 returns to step 420; otherwise the controller 201 continues to step 445.

In step 445, the controller 201 monitors for termination of the multimedia conference and continues to step 450. In step 450, if the multimedia conference is still active, the controller 201 returns to step 430; otherwise the controller 201 ends the operation. The end condition may be, for example, the disconnection of some or all of the user devices 100, 106 and 112, and the like.

Figure 5:
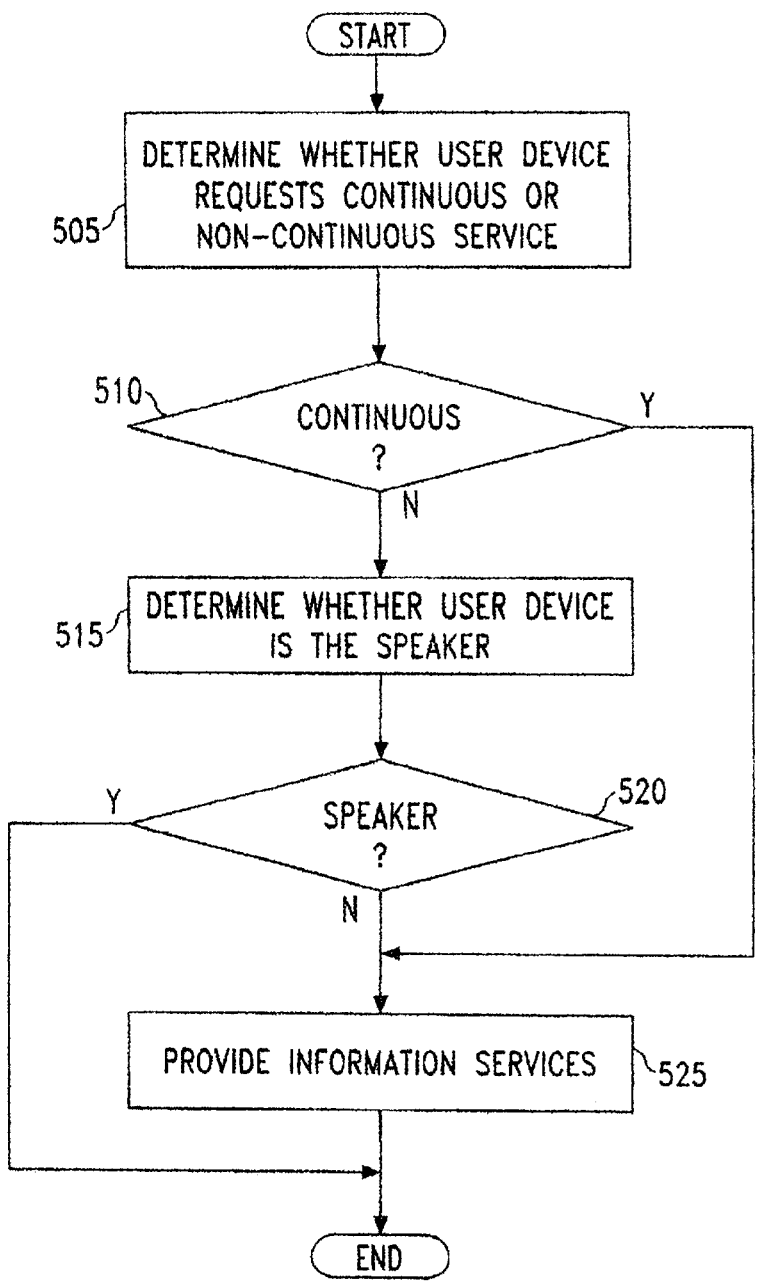
FIG. 5 is a flowchart of an exemplary operation for selectively providing information services to user devices of the invention.

FIG. 5 is a flowchart of an exemplary operation for selectively providing information services to a user device performed by the multimedia bridge 114 according to a first exemplary embodiment. The operation shown in FIG. 5 is executed for each user device determined to be requesting information services in step 420 of the above-described FIG. 4.

In step 505, the controller 201 determines whether the user device wants to continuously receive information services or only receive information services while not speaking (i.e., discontinuously receive information services). The controller then continues to step 510. In step 510, if the user device wants to continuously receive information services, the controller 201 jumps to step 525; otherwise, control continues to step 515.

In step 515, the controller 201 determines whether the user device is the speaker and continues to step 520. In step 520, if the user device is the speaker, the controller 201 ends the operation for selectively providing information services to the user device and returns to step 435 in the exemplary operation of the multimedia bridge 114 discussed with respect to FIG. 4. Otherwise, the controller 201 continues to step 525.

In step 525, the controller 201 provides information services to the user device. The controller 201 then ends the operation for selectively providing information services to the user device and returns to step 435 in the exemplary operation of the multimedia bridge 114 discussed with respect to FIG. 4.

The method and apparatus of the invention provide the ability for each operator of a user device participating in a multimedia conference to choose whether he/she wishes to receive information services during the multimedia conference. In addition, each user device may choose a different information service and/or a different format for viewing the information service.

As shown in FIG. 2, the method of this invention is preferably implemented on a programmed processor. However, the multimedia bridge 114 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device capable of implementing the flowchart shown in FIG. 4 can be used to implement the multimedia bridge 114 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of providing a multimedia conference between a plurality of user devices over a network, with start-up signals comprising:

identifying information services to be provided to at least one of the plurality of user devices during the multimedia conference, wherein at least two of the plurality of user devices request different information services;

controlling a media bridge for selectively provisioning the different information services to said at least two of the plurality of users;

providing multimedia conference signals to the at least two of the plurality of user devices, wherein the multimedia conference signals include the identified, different information services selectively requested by each of the at least two of the plurality of user devices;

determining whether the different information services of the at least two of the plurality of user devices are to be provided continuously or non-continuously, and wherein providing the multimedia conference signals further comprises at least one of continuously and non-continuously including the requested different information services in the multimedia conference signals;

monitoring the at least two of the plurality of user devices for a change in selection of information services to be provided; and modifying the multimedia conference signals in accordance with the change in selection of information services.

2. The method of claim 1, further comprising:

receiving start-up signals from one of the plurality of user devices;

sending start-up requests to the others of the plurality of user devices; and receiving start-up signals from each of the others of the plurality of user devices in response to the start-up requests, wherein the start-up signals include information for the identifying of the information services to be provided to the at least one of the plurality of user devices.

3. The method of claim 2, further comprising:

receiving a request from a user device to change the information for the identifying of the information service to be provided to the respective user device.

4. The method of claim 1, wherein the start-up signals include information for determining whether the different information services are to be provided continuously or non-continuously.

5. The method of claim 1, further comprising:
determining one of the plurality of user devices to be a speaker of the multimedia conference; and
discontinuing information services to user device that requests the discontinuance of information services and that is determined to be the speaker.

6. The method of claim 1, wherein sending multimedia conference signals that include the requested information services comprises at least one of sending real-time information from a service provider to the respective end user and sending stored information from a database to the respective end user.

7. The method of claim 1, wherein sending multimedia conference signals that selectively include the requested information services comprises providing the requested information services as at least one of superimposed text, a banner, a split-screen, and a picture-in-picture.

8. A communication apparatus for providing a multimedia conference between a plurality of user devices over a network, with start-up signals comprising:
a media bridge for selectively provisioning information services to at least one of the plurality of users;
a memory for storing information services related information; and
a controller in communication with the media bridge and memory, wherein the controller identifies information services to be provided to at least two of the plurality of user devices during the multimedia conference, wherein the at least two of the plurality of user devices request different information services, and provides multimedia conference signals to the at least two of the plurality of user devices, and wherein the multimedia conference signals selectively include the requested different information services for the at least two of the plurality of user devices wherein the controller determines whether the information services of the at least two of the plurality of user devices are to be provided continuously or non-continuously and provides the information services in the multimedia conference signals in accordance with the determination
means for monitoring the at least one two of the plurality of user devices for a change in selection of information services to be provided, said means for monitoring in communications with said controller; and
a means for modifying the multimedia conference signals in accordance with the change in selection of information services.

9. The communication apparatus of claim 8, wherein the controller receives start-up signals from one of the plurality of user devices, sends start-up requests to others of the plurality of user devices, and receives start-up signals from each of the others of the plurality of user devices in response to the start-up requests, and wherein the start-up signals include information for identifying the information services to be provided to the at least one of the plurality of user devices.

10. The communication apparatus of claim 9, wherein the controller receives a request from a user device to change the information for identifying the information service to be provided to the respective user device.

11. The communication apparatus of claim 10, wherein the start-up signals include information for determining whether the information services are to be provided continuously or non-continuously.

12. The communication apparatus of claim 8, wherein the multimedia conference signals that include the requested information services comprise at least one of real-time information from a service provider and stored information from a database.

13. The communication apparatus of claim 8, wherein the controller provides the requested information services as at least one of superimposed text, a banner, a split-screen, and a picture-in-picture.

14. A method of providing a multimedia conference between a plurality of user devices over a network comprising:
receiving a request from at least two of the plurality of user devices requesting different information services;
identifying information services to be provided to the at least two of the plurality of user devices during the multimedia conference;
determining whether the information services of the at least two of the plurality of user devices are to be provided in at least one of a continuous or non-continuous manner;
determining one of the plurality of user devices to be a speaker of the multimedia conference; and discontinuing information services to the user device that requests the discontinuance of information services and that is determined to be the speaker; and
providing multimedia conference signals to at least one of the at least two of the plurality of user devices, wherein the multimedia conference signals include the identified information services in at least one of a continuous and non-continuous manner, said step of providing multimedia conference signals further comprising sending multimedia conference signals that selectively include the requested information services to each of the at least two of the plurality of user devices.

15. A communication apparatus for providing a multimedia conference between a plurality of user devices over a network, comprising:
a memory; and
a controller in communication with said memory, wherein at least two of the plurality of user devices request different information services, and
the controller identifies different information services to be provided to the at least two of the plurality of user devices during the multimedia conference,
the controller sends multimedia conference signals that selectively include the requested information services to each of the at least two of the plurality of user devices, and wherein the multimedia conference signals comprise the identified information services,
the controller determines whether the different information services of the at least two of the plurality of user devices are to be provided continuously or non-continuously and provides the different information services in the multimedia conference signals in accordance with the determination, and
the controller receives start-up signals from one of the plurality of user devices, and the start-up signals include information for determining whether the information services are to be provided continuously or non-continuously.

* * * * *